April 23, 1957  G. G. ENSIGN ET AL  2,789,411
ELECTRIC TIMEPIECE WITH POWER TAKE-OFF
Filed April 19, 1954  5 Sheets-Sheet 1

INVENTORS
George G. Ensign,
Glenn T. Soper and
Ossian Lundahl

BY Mason, Porter, Diller & Stewart,
ATTORNEYS

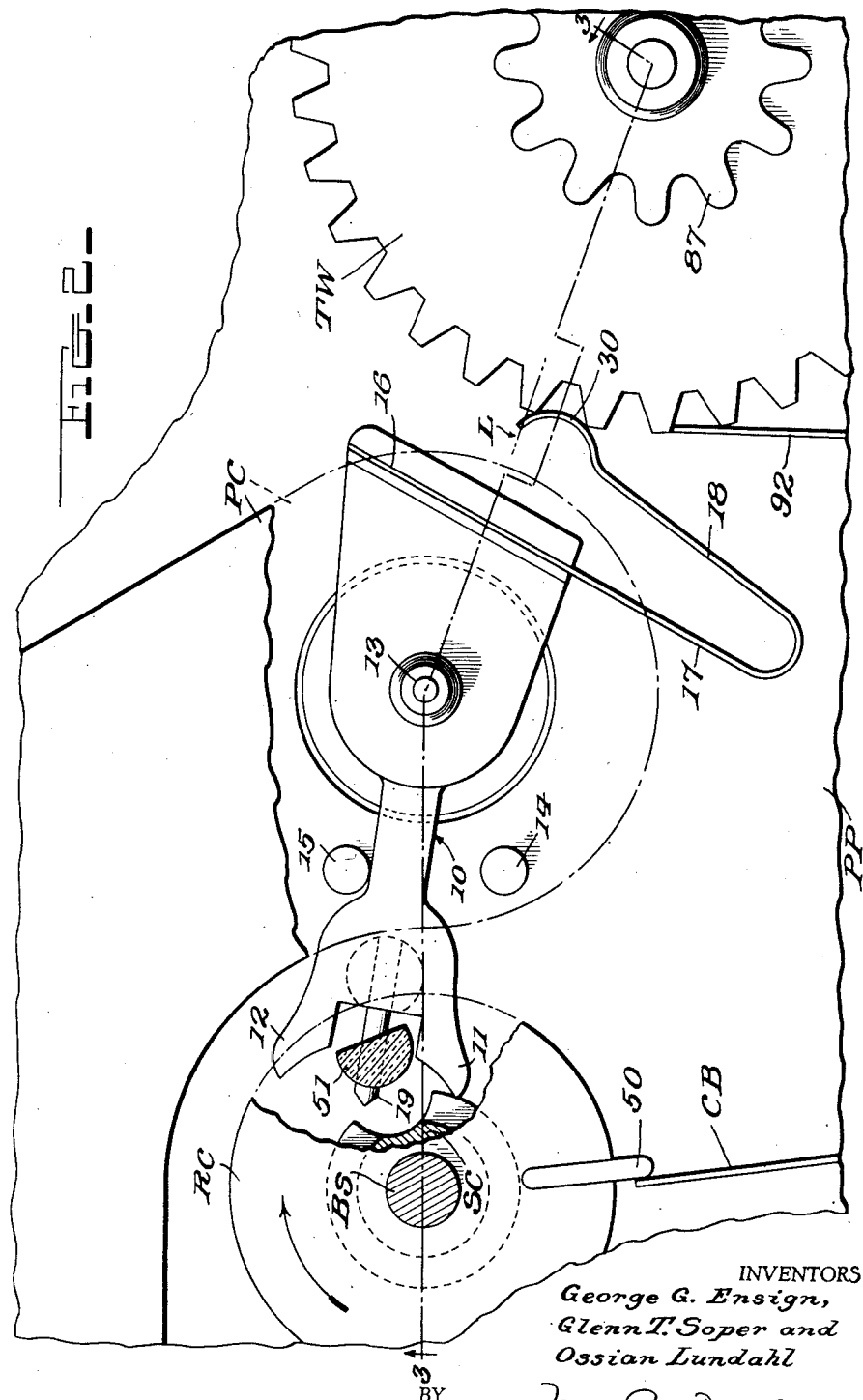

April 23, 1957   G. G. ENSIGN ET AL   2,789,411
ELECTRIC TIMEPIECE WITH POWER TAKE-OFF
Filed April 19, 1954   5 Sheets-Sheet 3
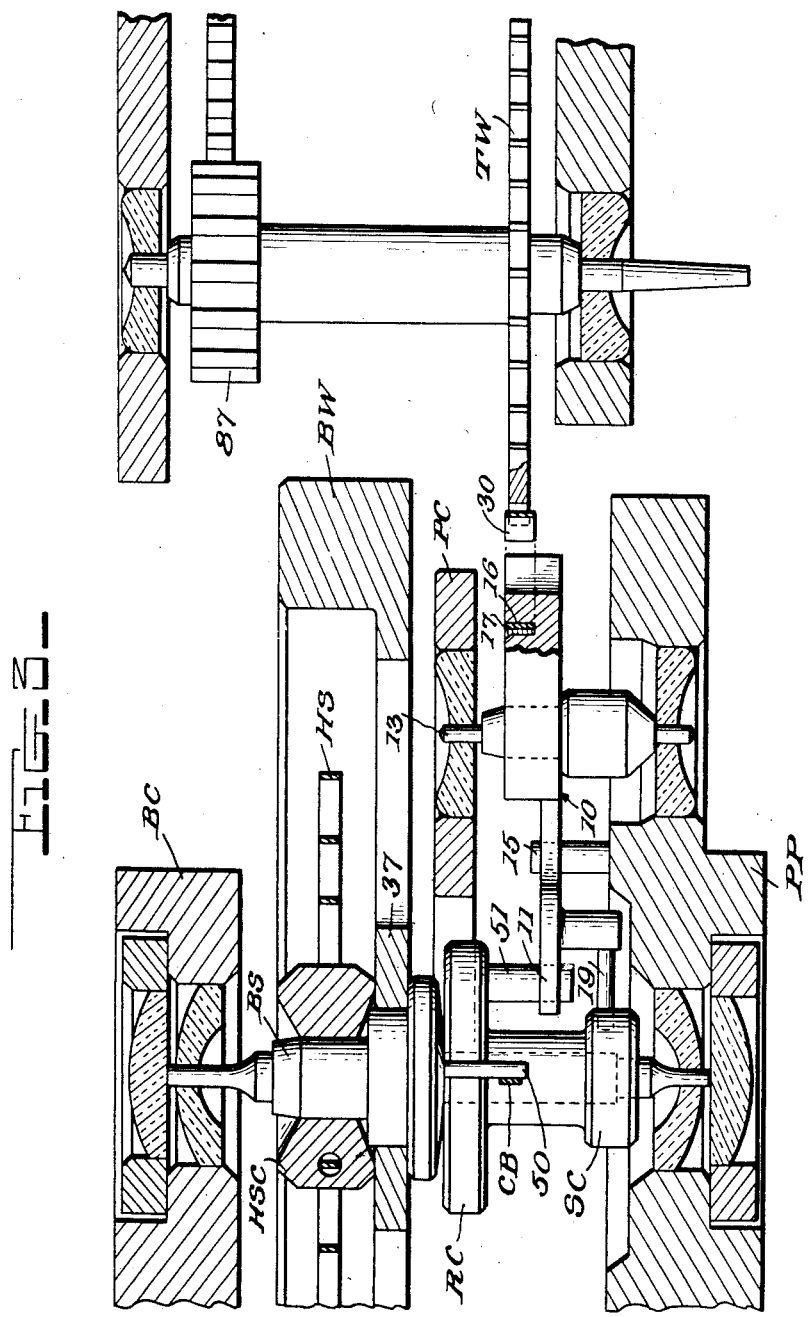
INVENTORS
George G. Ensign,
Glenn T. Soper and
Ossian Lundahl
BY Mason, Porter, Diller & Stewart
ATTORNEYS

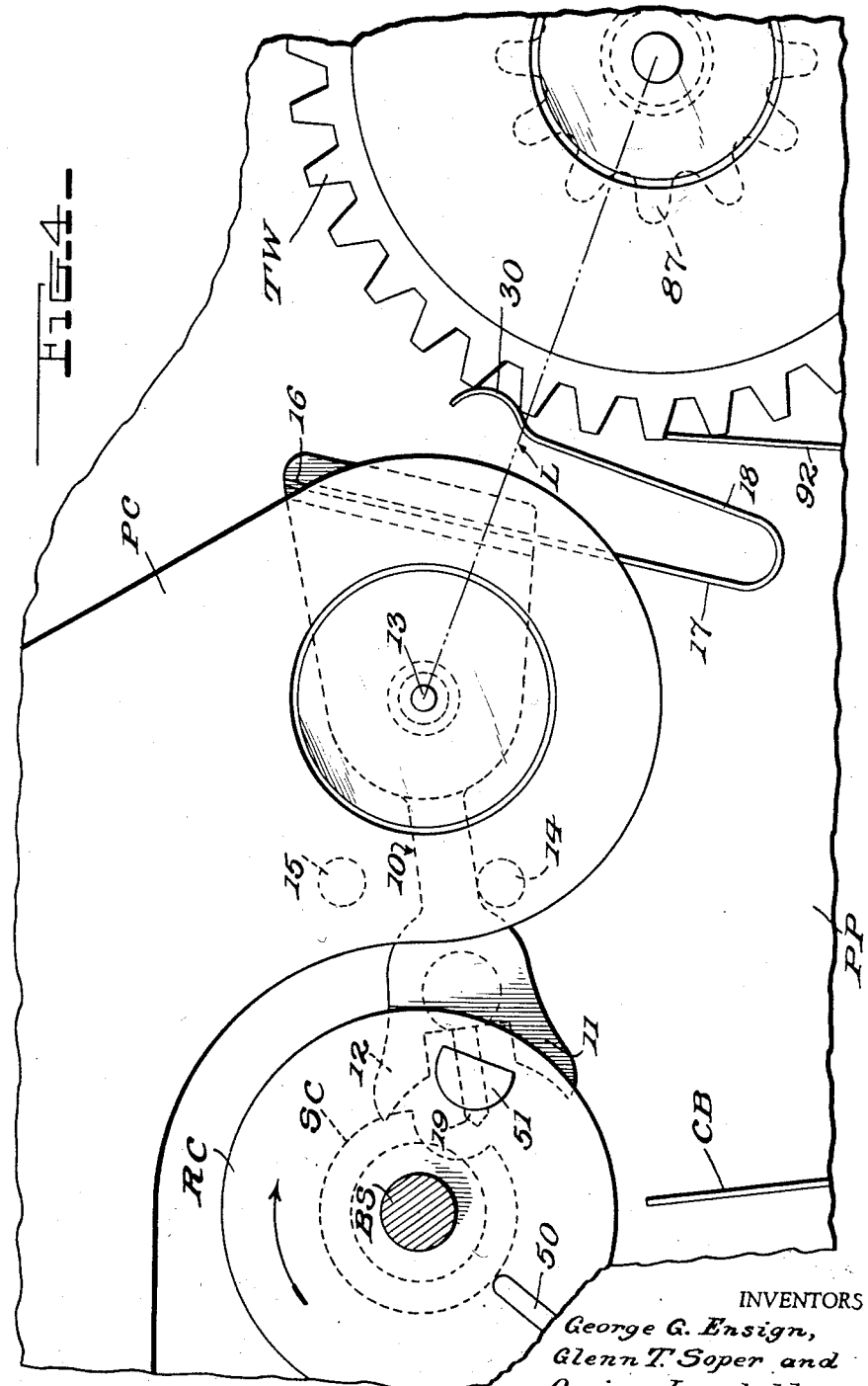

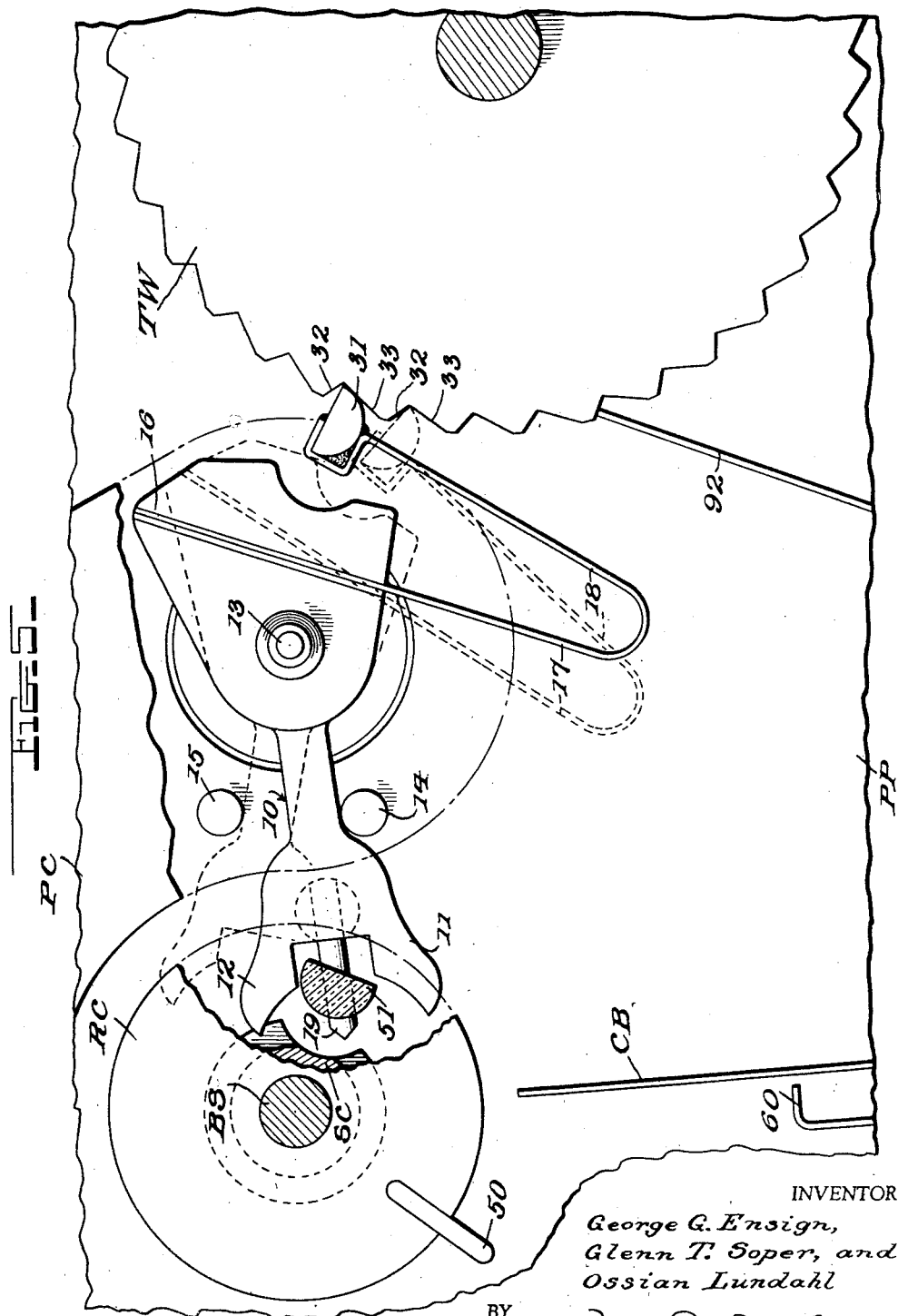

United States Patent Office 2,789,411
Patented Apr. 23, 1957

2,789,411

ELECTRIC TIMEPIECE WITH POWER TAKE-OFF

George G. Ensign and Glenn T. Soper, Elgin, Ill., and Ossian Lundahl, Orlando, Fla., assignors to Elgin National Watch Company, Elgin, Ill., a corporation of Illinois Application April 19, 1954, Serial No. 423,894

15 Claims. (Cl. 58—28)

This invention relates to improvements in energy transfer devices for converting an oscillatory motion into an intermittent continually advancing movement of an integrating system, and is particularly of value in timepieces where the available energy is low; and is hereinafter sometimes referred to as a "power take-off" as the energy of the horological rate-determining element is transferred to a train for moving the indicator.

A feature of the invention is the provision of an assembly of an oscillatory rate-determining element, a rocking member reciprocated thereby, a train including a transfer wheel, a spring-pressed means carried by the rocking member for advancing the transfer wheel during one stroke of an oscillation and ineffectively passing the same during the other stroke thereof, and means for preventing retrograde movement of the train, and in which the spring is also employed to avoid a false positioning of parts.

Another feature is the provision of an electrically actuated watch structure including a balance and devices for delivering impulses thereto at a time determined by the position of the balance in its oscillating cycle through momentary electrical circuit closure, a train including a transfer element actuated from the balance through a rocking member having a spring-pressed pawl element, and stop means included with the rocking member and employing the spring for preventing a second impulsing upon excessive amplitude in a stroke of the cycle.

A further feature is the provision of a horological structure including a balance, a pin oscillated with the balance, a pallet actuated by the pin, overbanking stops to limit the pallet movement, a spring rocked with the pallet, and a train including a transfer wheel having ratchet teeth intermittently advanced by the spring and cooperative therewith to prevent false positioning of the pallet.

A further feature is the provision of a power take-off device in which a pallet is rocked by an oscillatory structure and carries a spring pawl piece for engaging and advancing a transfer wheel, and in which the pallet and transfer wheel have a toggle action in conjunction with the spring to prevent false movement of the pallet.

With these and other features as objects in view, as will appear in the course of the following description and claims, an illustrative form of practice is shown on the accompanying drawings, in which:

Fig. 2 is an enlarged plan view showing balance and power transfer elements, with other elements in part broken away for clearness, in position for initiating a transfer movement;

Fig. 3 is a sectional view substantially on the broken line 3—3 of Fig. 2;

Fig. 4 is a fragmentary view corresponding to a part of Fig. 2, and showing the elements in a different position of the operation;

Figure 1:
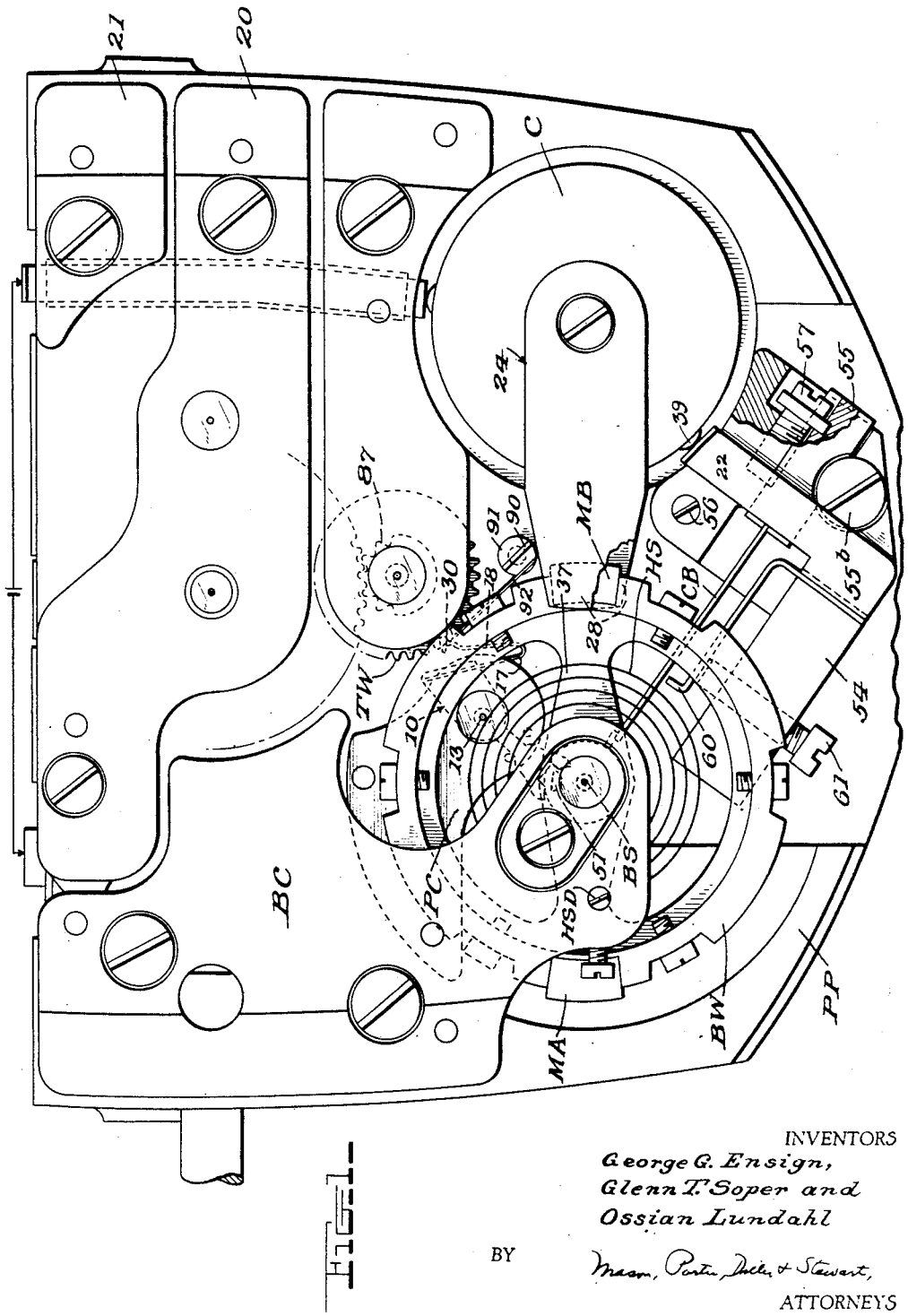
Fig. 1 is a plan view of an electrically actuated watch movement, including one form of the present invention.

Fig. 5 corresponds to Fig. 2 and shows a second form of structure.

In the illustrative forms, the instant invention is shown in connection with an electrically actuated wrist watch.

In the illustrative forms, a support is provided including balance cock BC, and bridges and plate pieces 20, 21, PC. A yoke 24 of magnetizable material has an electrical coil or winding C thereon, and presents opposed pole pieces 28. A balance staff BS is mounted in bearings in the plate PP and balance cock BC and supports a diametrical arm 37 connected with the balance wheel rim BW having thereon the diametrically opposed masses MA, MB. The wheel BW and mass MA are of non-magnetizable material such as brass, while mass MB is of magnetizable material. The masses pass between the pole pieces during oscillation of the balance assembly. The balance staff BS has a collect HSC to which is secured a hairspring HS connected to a stud HSD on the cock BC.

A roller collect RC on the staff BS supports a contact fin 50 which engages and moves the contact blade CB closely adjacent the neutral axis or point of maximum velocity of the balance. A side contact 60 is engaged by the blade CB when moved in one stroke, e. g. the clockwise stroke, of each oscillation cycle. A block 54 of insulating material is supported on the plate PP by screw 56 and slidingly supports a block 55 which can be moved toward and from the balance axis by a screw 57 having a flange engaging a kerf in the block 55: the contact blade CB is carried by the block 55 and is held in a desired position of depth relative to the arcuate path of fin 50 by the binding screw 55b which also conducts electric current from the plate PP to the block 55 and blade CB. The tension and position of contact 60 may be regulated by the screw 61 carried in block 54. Conductor 22 electrically connects the contact 60 to a terminal 39 of the coil C.

The roller collect RC also carries a pin or roller 51 for engaging the pallet 10 supported by the staff 13 pivoted in plate PP and the pallet bridge PC. The pallet has at one end a fork with tines 11, 12 for engagement by the pin 51, and a safety pin 19 for cooperating with the safety collect or roller portion SC having the usual passing hollow. Banking pins 14, 15 limit the pallet movement. At the other end, the pallet 10 has a notch 16 in which is secured a blade spring of rebent shape having the legs 17, 18.

An outwardly curled portion 30 of the blade spring engages in the spaces of the toothed transfer wheel TW and rests against adjacent teeth while the pallet is at rest. The transfer wheel TW is provided with a pinion 87 pivoted in the plate and bridge structure and connected to drive the other parts of the watch train. The shape and position of the blade spring is such, relative to the line joining the axes of the pallet staff and the transfer wheel TW, that the portion 30 lies at one side of that line when the pallet rests against banking pin 14, and at the other side of that line when the pallet is against banking pin 15: that is, the legs 17, 18 are pressed together as the pallet rocks.

A detent pawl 92 is provided by a spring blade mounted at one end in the friction-tight stud 91 in the plate PP, this stud having a kerf 90 by which it may be rotated to adjust the position and tension of the spring. At its other end, the pawl 92 engages the teeth of the transfer wheel TW.

In operation of the illustrative device, when the balance moves in the clockwise stroke (arrow, Fig. 2), the pin 51 passes the pallet tine 12 as it approaches the neutral axis. The pallet 10 is then resting against the banking pin 15 and held in this position by the toggle effect between the transfer wheel TW and the pallet 10, through the spring 17, 18. The transfer wheel TW presents a tooth against the detent 92 and is prevented from counter-clockwise movement, and the resistance in spring 17, 18 prevents clockwise movement of the transfer wheel. The pin 51 enters the fork notch and encounters the tine 11, and provokes a counterclockwise rocking of the pallet, from banking pin 15 to banking pin 14: therewith the curled portion 30 presses against the teeth of the transfer wheel TW while the legs 17, 18 are being pressed relatively toward one another; and the wheel TW is caused to advance one tooth distance, the detent 92 slipping one tooth; and the curled portion 30 passes the center line L between the pallet and wheel axes. The pin 51 now leaves the pallet notch; but the pallet 10 is now held in the position of Fig. 4, as the spring 17, 18 presses against it and prevents a relative clockwise rocking away from banking pin 14 and any such movement of the spring 17, 18 with the transfer wheel TW is prevented by detent 92. Clockwise movement of the transfer wheel TW is limited by train friction, noting that this is the driving direction whereby backlash has been taken up; and by the engagement of the pallet 10 with banking pin 14 whereby the curled portion 30 cannot make a major movement relatively upward in Fig. 4.

The balance completes its clockwise or forward stroke, and then returns. The pin 51 in its concurrent movement again approaches the neutral axis in this counter-clockwise or return stroke, passes the tine 11, which is in the position of Fig. 4, and enters the fork and encounters the tine 12, and causes the reverse or clockwise rocking of the pallet 10. The transfer wheel TW is held against retrograde movement by the detent 92; and the curled portion 30 slips by one tooth distance along the transfer wheel, passing from one tooth gap to the next and therewith passing the line L with movement of the legs 17, 18 toward one another while the curled portion approaches the line and then separating as it leaves the line: hence the spring assumes the position where it cooperates in the toggle action to maintain the pallet 10 in the position of Fig. 2, i. e. against the banking pin 15, and ready to receive the pin 51 in the next forward stroke. The parts have now returned to the position of Fig. 2. The pin 51 continues in its return stroke, leaving the pallet, and completes this stroke and commences its return, whereupon the cycle is repeated.

Concurrently with the above passing and power take-off or energy transfer from pin 51 to the wheel TW, the fin 50 has engaged the contact blade CB and pressed it toward and into engagement with the contact 60, so that a pulse of current flows through the coil C and the yoke 24 and pole pieces are energized to deliver a magnetic effort to the mass MB, thereby impulsing the balance to maintain its motion and in effect making the balance itself a mere connecting link whereby the necessary energy is concurrently delivered to the train for advancing the same.

Thus, the system operates by delivering energy to the wheel TW to advance the same intermittently by one tooth for each oscillation cycle.

In the form in Fig. 5, the major parts are as before. The curled portion 30 is replaced by a secured pawl nose or pallet stone 31 which may be of wear-resisting material such as ruby or sapphire. In Fig. 5, the transfer wheel TW has teeth with a slope 32 for engagement in the driving direction which is at a less angle to the wheel radius than the other slope 33, wherewith there is a distributed effort over the course of the return or tooth-passing movement of the pallet; and, in entering the fully returned position (dotted lines, Fig. 5), the stone 31 slides along the steep face 32, and hence assists in moving the pallet into contact with the banking pin 14 and preventing rebound.

In each form, the pallet and transfer wheel form a system which prevents the pallet fork from moving to a false position in which it is not ready to receive the pin 51, through a toggle joint effect.

The invention is not restricted to the illustrative forms, and can be employed in many ways within the scope of the appended claims.

We claim:

1. In an electrically actuated time-piece having a balance and electrically energized means for impulsing the same under control of the balance, and a time train, the combination which comprises a pallet rocked from the balance, means for limiting the rocking movement of the pallet, a toothed transfer wheel connected for driving the train, yielding means carried by the pallet and including a part for engaging the wheel teeth and successively advancing the said wheel during forward strokes of the balance, and a detent for preventing retrograde movement of the transfer wheel during the return strokes of the balance said yielding means including a portion cooperative with said part for holding the latter engaged with the transfer wheel and effective upon the pallet for urging the same from an intermediate position toward the adjacent end position of engagement of the pallet with said limiting means.

2. A time-piece having an oscillating rate-determining element and an element to be moved forwardly therefrom to measure elapsed time, the combination therewith of a transfer wheel connected for moving said elapsed time element, means for limiting retrograde movement of the transfer wheel, a member engaged by the rate-determining element during each oscillatory stroke thereof and thereby reciprocated, means for limiting the end positions of said member upon reciprocation, said member including a resiliently yielding part moved therewith and engaged with said transfer wheel at said end positions and effective for advancing the wheel during the forward reciprocatory strokes and for moving along the wheel during the rearward reciprocatory strokes said yielding means including a portion cooperative with said part for holding the latter engaged with the transfer wheel and effective upon the pallet for urging the same from an intermediate position toward the adjacent end position of engagement of the pallet with said limiting means.

3. A time-piece having an oscillating rate-determining element and an element to be moved forwardly therefrom to measure elapsed time, the combination therewith of a transfer wheel connected for moving said elapsed time element, means for limiting retrograde movement of the transfer wheel, a member engaged by the rate-determining element during each oscillatory stroke thereof and thereby reciprocated, means for limiting the end positions of said member upon reciprocation; said member having a part moved therewith in an arcuate path concentric with and along the wheel and effective during said reciprocation to advance the transfer wheel stepwise, and resilient means cooperative with said part at said end positions for causing the part to exert a toggle action with said transfer wheel.

4. In an electrically actuated time-piece having a balance and electrically energized means for impulsing the same under control of the balance, and a time train, the combination therewith which comprises a pallet rocked from the balance, means for limiting the rocking movement of the pallet, a toothed transfer wheel connected for driving the train, yielding means carried by the pallet and including a part for engaging the wheel teeth and successively advancing the said wheel during forward strokes of the balance, and a detent for preventing retrograde movement of the transfer wheel during the return strokes of the balance, said part occupying a position at one side of the line joining the pallet and transfer wheel axes when the pallet is in one limited end position and at the other side of said line when the pallet is in the other limited end position.

5. A power take-off system for connecting an oscillating structure to a driven member for unidirectional forward movement of the latter, comprising a pallet driven from said structure, means for limiting the motion of said pallet, a toothed transfer wheel connected to said driven member, and a U-spring member connected at one end to said pallet and presenting its other end in maintained contact against said transfer wheel teeth for moving said wheel, the point of contact of said other end being at one side of a line joining the axes of the transfer wheel and pallet when the pallet is at one limit of motion and being at the other side of said line when the pallet is at the other limit of motion, and means for preventing retrograde motion of said wheel.

6. A power take-off system for connecting an oscillating structure to a driven member for unidirectional forward movement of the latter, comprising a pallet driven from said structure, means for limiting the motion of said pallet, a toothed transfer wheel connected to said driven member, and a U-spring member connected at one end to said pallet and presenting its other end against said transfer wheel teeth for moving said wheel, the point of contact of said other end being at one side of the line connecting the axes of the pallet and wheel when the pallet is at one limit of motion and being at the other side of said line when the pallet is at the other limit of motion, and means for preventing retrograde motion of said wheel.

7. In a timing device, a power take-off system for connecting an oscillating structure to a driven member for unidirectional forward movement of the latter, comprising a pivoted member driven from said structure, means for limiting the motion of said pivoted member, transfer means connected to said driven member, and a yieldable element rigidly connected at one end to said pivoted member and having its other end free and presented against said transfer means for moving said transfer means, the point of contact of said other end being at one side of the line connecting the axes of the pivoted member and transfer means when the pivoted member is at one limit of motion and being at the other side of said line when the pivoted member is at the other limit of motion, and means for preventing retrograde motion of said wheel.

8. In a timing device, a power take-off system for connecting an oscillating structure to a driven member for unidirectional forward movement of the latter, comprising a pivoted member driven from said structure, means for limiting the motion of said pivoted member, a transfer element connected for moving said driven member and a yieldable element operatively associated with said pivoted member and having a free end relatively movable along the transfer element, the operative point of contact of said yieldable element being upon opposite sides of a line between the axes of said pivoted member and transfer element dependent upon the position of said pivoted member, whereby the yieldable element resiliently yields during movement of the pivoted member from either end position and by its resilience is effective to urge the pivoted member toward its adjacent end position.

9. A power take-off structure for a time mechanism having an oscillating rate-determining device and effective to procure intermittent unidirectional forward movement of a driven integrating element, comprising a lever rocked back and forth by said device, a rotatable transfer member connected for driving said integrating element, and a pawl device carried by said lever and having a pawl end moving concentrically with the transfer member for acting upon said member to move the same and being so located on the lever that the point of engagement of said pawl device and member is shifted from side to side of the line joining the axes of the lever and the transfer member, said pawl device including resilient means for exerting force along said lever from the pawl toward the lever axis for maintaining engagement of the pawl end with the transfer member and by reaction urging the lever toward a said end position and maintaining it against moving toward said line, and a detent effective to prevent backward movement of the transfer member.

10. A power take-off structure for a time mechanism having an oscillating rate-determining device and effective to procure intermittent unidirectional forward movement of a driven integrating element, comprising a lever rocked back and forth by said device, a rotatable transfer member connected for driving said integrating element and a device carried by the lever and interposed between the lever and the member and resiliently extensible and compressible in the direction of the line joining the axes of the lever and the member, said device having an end engaging and effective to cause the member to move with the lever in the element-advancing direction, a detent for preventing retrograde motion of said member whereby the said extensible device moves along the periphery of the member during retrograde movement of the lever, and means for limiting the movements of the lever.

11. A timing mechanism having an oscillating rate-determining device, a lever rocked back and forth by said device, means to limit the rocking movements of said lever, a rotatable transfer member and means for limiting retrograde movement thereof, and connecting means carried by and moving with the lever and having a first part engaging the transfer member for exerting tangential forces upon the transfer member as the lever rocks, and a second part for exerting a force upon the lever in the radial direction relative to the lever axis and effective to cause the lever to maintain contact with the respective said limiting means between its aforesaid rocking movements.

12. A power take-off system for connecting an oscillating structure to a driven member for unidirectional forward movement of the latter, comprising a pallet driven from said structure, means for limiting the motion of said pallet, a toothed transfer wheel connected to said driven member, and a U-spring member connected at one end to said pallet and having at the other end a piece engaging adjacent teeth of the transfer wheel for moving said wheel, the point of contact of said other end being at one side of the line connecting the axes of the pallet and wheel when the pallet is at one limit of motion and being at the other side of said line when the pallet is at the other limit of motion, and means for preventing retrograde motion of said wheel.

13. In a time-piece having a support, a balance and a train, the combination comprising a transfer wheel connected for driving the train, a rigid rockable transfer element, means for limiting the rocking movements of said transfer element, a part on the balance for directly engaging and rocking said transfer element, a yieldable member actuated and moved by said transfer element for procuring advancement of said transfer wheel during forward strokes of the balance and yielding and moving relative to the transfer wheel during return strokes of the balance, and means for preventing retrograde movement of the transfer wheel, said yieldable member being constructed and arranged for cooperation with the pallet resiliently to hold the same engaged with the limiting means.

14. In a timing device, a power take-off system for connecting an oscillating structure to a driven member for effecting forward movement of the latter, comprising a shiftable member driven from said structure, means for determining certain positions occupied by said shiftable member, a transfer element connected for moving the driven member, a resiliently yieldable member carried by the shiftable member with a portion of the yieldable member thereby positioned in shiftable engagement with said transfer element, and a detent effective to limit backward movement of the transfer element, the said portion being so positioned upon the shiftable member that it is moved back and forth thereby from a position at one side of a line between the said shiftable member and the axis of the transfer element to a position at the other side of said line wherewith the yieldable member is stressed resiliently during movement in either direction toward said line and is effective for holding the shiftable member in its prevailing determined position when it is not being driven from said structure, said portion during movement in one direction causing the transfer element to move forward while passing said detent and during movement in the other direction being active to shift along the transfer element while said transfer element is held by said detent.

15. In a timing device, a power take-off system for connecting an oscillating structure to a driven member for effecting forward movement of the latter, comprising a pivoted rockable member driven from said structure, means for determining the end positions occupied by said rockable member, a transfer element connected for moving the driven member, a resiliently yieldable member carried by the rockable member with an end of the yieldable member thereby positioned in shiftable engagement with said transfer element, and a detent effective to limit backward movement of the transfer element, the said end being so positioned upon the rockable member that it is moved back and forth thereby from a position at one side of a line between the axes of the said rockable member and transfer element to a position at the other side of said line wherewith the yieldable member is stressed resiliently during movement in either direction toward said line and is effective for holding the rockable member in its prevailing determined position when it is not being driven from said structure, said end during movement in one direction causing the transfer element to move forward while passing said detent and during movement in the other direction causing its end to shift along the transfer element while said transfer element is held by said detent.

References Cited in the file of this patent
FOREIGN PATENTS

| | | |
|---|---|---|
| 332,159 | Great Britain | July 17, 1930 |
| 705,966 | Germany | May 14, 1941 |
| 766,968 | France | Apr. 23, 1934 |